United States Patent
Kitamura

[11] Patent Number: 5,951,059
[45] Date of Patent: Sep. 14, 1999

[54] TUBE CONNECTOR DEVICE HAVING CONNECTOR HOLDER MADE OF ELASTOMER

[75] Inventor: Hirokazu Kitamura, Kasugai, Japan

[73] Assignee: Tokai Rubber Industries Ltd., Japan

[21] Appl. No.: 08/897,453

[22] Filed: Jul. 22, 1997

[30] Foreign Application Priority Data

Jul. 24, 1996 [JP] Japan ................................. 8-194356
Jul. 24, 1996 [JP] Japan ................................. 8-194357
Jul. 24, 1996 [JP] Japan ................................. 8-194358

[51] Int. Cl.$^6$ .................................................. A16L 35/00
[52] U.S. Cl. .......................... 285/24; 285/26; 285/124.4; 285/139.3; 285/140.1; 285/141.1; 285/142.1; 285/906
[58] Field of Search ............................ 285/139.1, 139.2, 285/139.3, 140.1, 141.1, 142.1, 143.1, 205, 194, 24, 26, FOR 140, 124.4, 906

[56] References Cited

FOREIGN PATENT DOCUMENTS 6-80976  11/1994  Japan .
7-38883   7/1995  Japan .

Primary Examiner—Dave W. Arola
Attorney, Agent, or Firm—Parkhurst & Wendel, LLP

[57] ABSTRACT

A tube connector device for connecting at least one first tube which is disposed on one side of a panel and at least one second tube which is disposed on the other side of the panel, the tube connector device including (a) at least one tubular connector for connecting the first tube and the second tube, such that the first tube is attached to one open end of the connector while the second tube is attached to the other open end, (b) a connector holder for holding the connector such that the connector holder is fitted on an external circumferential surface of the above-indicated other open end of the connector, and (c) a fixture for attaching the connector holder to the panel such that the connector holder is fitted into a communication hole formed through the panel, and wherein the connector holder is made of a rubber or a thermoplastic elastomer, and includes a tubular body having an axial hole engaging the above-indicated other open end, and a flange portion extending outwardly from the tubular body in a radial direction of the connector holder, the connector holder being attached at the flange portion to the panel by the fixture.

20 Claims, 18 Drawing Sheets

TUBE CONNECTOR DEVICE HAVING CONNECTOR HOLDER MADE OF ELASTOMER

This application is based on Japanese Patent Applications No. 8-194356 filed Jul. 24, 1996, No. 8-194357 filed Jul. 24, 1996 and No. 8-194358 filed Jul. 24, 1996.

BACKGROUND OF THE INVENTION

1. Field of the Invention

The present invention relates to a tube connector device for connecting tubes or pipes which are disposed or distributed on the opposite sides of a partition or a panel of an automotive vehicle or a machine.

2. Discussion of the Related Art

Where a plurality of tubes disposed on an upper side of a floor panel should be connected to respective tubes disposed on a lower side of the floor panel, as in the case of tubing work for a fuel tank of an automotive vehicle, the tubes disposed on the upper side is fixed together to the floor panel through a suitable holder while each of the tubes disposed on the upper side is connected to one of opposite ends of a suitable connector. A lower end of the holder is projected downwardly from the floor panel while each of the tubes disposed on the lower side is connected to the other of opposite ends of the connector, whereby the tubes of the upper side are connected to the respective tubes of the lower side.

With the intention of improving an efficiency in such a tubing work as described above, there are proposed tube connector devices having various types of constructions. An example of the tube connector device is disclosed in laid-open Publication No. 4-114193 (published in Oct. 7, 1992) of an unexamined Japanese Utility Model Application. This tube connector device includes: (a) a plurality of connectors which are fixed to axial ends of respective tubes; (b) two divided spacers for holding the connectors in respective positions; (c) a holder for accommodating and holding the spacers therein; and (d) a retainer for fixedly attaching the holder to a floor panel such that the holder is located in alignment with a communication hole which is formed through a floor panel. The above-described two divided spacers are obtained by dividing a spacer such that one of spacers is located on one of opposite sides of a line extending in a direction of the arrangement of the connectors and such that the other of spacers is located on the other of opposite sides.

Another type of tube connector device is disclosed in laid-open Publication No. 6-36932 (published in May 17, 1994) of an unexamined Japanese Utility Model Application. This type of tube connector device includes: (a) a plurality of connectors which are connected to respective tubes such that one axial end of each of the connectors is attached to one of the tubes; and (b) a grommet which holds the connectors in respective positions and which is fixedly attached to a communication hole formed through a floor panel by suitable bolts. The grommet includes a base portion which has guide walls and flexible tabs. The guide walls are fitted in the communication hole, while the flexible tabs are engaged with a peripheral portion of the communication hole. Further, the grommet is dividable into two pieces, for facilitating attachment of the connectors to the grommet.

In each of the above-described conventional devices, since the holder or grommet for holding the connectors is made of a rigid resin or a metallic material, a sealing member such as an O-ring and a sponge rubber has to be necessarily employed to be interposed between the connectors and the holder or grommet for assuring a fluid-tightness. This results in an increased number of component parts of the device and possibly requires a component dividable into two pieces. Thus, the above conventional device does not exhibit a satisfactory performance in reducing a required cost for the fabrication.

SUMMARY OF THE INVENTION

It is therefore an object of the present invention to provide a tube connector device which has a simple construction constituted by a reduced number of component parts without a particular sealing member, and which is capable of easily connecting tubes disposed on the opposite sides of a panel. More in particular, the object of the present invention is to provide a suitable device for concurrently connecting a plurality of tubes in a tubing system for a fuel tank of an automotive vehicle.

The above object may be achieved according to the principle of the present invention, which provides a tube connector device for connecting at least one first tube which is disposed on one of opposite sides of a panel and at least one second tube which is disposed on the other of opposite sides of the panel, the tube connector device comprising: (a) at least one tubular connector for connecting the first tube and the second tube, such that the first tube is attached to one of opposite open ends of the connector while the second tube is attached to the other of the open ends; (b) a connector holder for holding the at least one tubular connector such that the connector holder is fitted on an external circumferential surface of the above-indicated other of the open ends of the connector; and (c) fixing means for fixedly attaching the connector holder to the panel such that the connector holder is fitted into a communication hole which is formed through the panel, and wherein the connector holder is made of a rubber or a thermoplastic elastomer, and includes a tubular body having an axial hole which engages the above-indicated other of the open ends of the connector, and a flange portion which extends outwardly from the tubular body in a radial direction of the connector holder, the connector holder being fixedly attached at the flange portion to the panel by the fixing means.

In the tube connector device of the present invention constructed as described above, the connector holder can be provided with a plurality of axial holes for holding the same number of connectors such that the connectors are fitted into the respective axial holes. Thus, the present tube connector device is suitable, for example, for a fuel supply system connected to a fuel tank of a vehicle, which system includes a plurality of tubes. The connector used in the present device may be of a conventional type.

Further, in the tube connector device of the present invention, since the connector holder is made of an elastomer such as a caoutchouc and a synthetic rubber or alternatively a thermoplastic elastomer such as polyethylene (TPS) and polyolefine (TPO), there is no necessity of interposing a particular sealing member such as an O-ring or a sponge rubber between the connector holder and the connector which is fitted into the axial hole of the connector holder, and between the panel and the connector holder which is attached to the panel. The connector holder made of the elastomer or thermoplastic elastomer is capable of being firmly secured to the connector and the panel owing to its own elasticity, assuring a sufficient fluid-tightness therebetween.

The connector holder made of the elastomer or thermoplastic elastomer provides another advantage, namely, facilitates the attachment of the connector to the connector holder and the removable of the connector from the connector holder. That is, the connector can be attached to the connector holder by simply inserting the connector into the axial hole of the connector holder. Besides, the attached connector can be removed from the connector holder if needed. Therefore, even where the tube or connector needs to be replaced by a new one in the field after the device installed on a product such as an automotive vehicle has been on the market, the tube or connector can be easily removed from the connector holder so as to be replaced by a substitute.

The elastomer as the material for the connector holder may be, for example, ethylene-propylene rubber (EPDM), or acrylonitrile-butadiene rubber (NBR), while the thermoplastic elastomer as the material for the connector holder may be, for example, a blend of a polypropylene and ethylene-propylene rubber, or a block-copolymer of polystyrene-polybutadiene (SBS).

According to a first preferred aspect of the present invention, the tube connector device further comprises an attaching member including a tubular portion which is fitted on an external circumferential surface of the tubular body, and a plate portion which extends outwardly from an axial end of the tubular body in a radial direction of the attaching member such that the plate portion covers at least the flange portion, and wherein the connector holder is fixedly attached to the panel by the fixing means such that the flange portion is interposed and gripped by and between the plate portion and the panel.

In the above first preferred aspect of the invention, the flange portion of the connector holder is pressed by the attaching member which can be made of a rigid material, and is fixedly attached to the panel by the fixing means. That is, the flange portion of the connector holder which is made of the elastomer or thermoplastic elastomer is pressed onto a surface of the panel by the attaching member made of the rigid material, whereby the connector holder and the panel adhere to each other, assuring a fluid-tightness therebetween.

According to a first preferred form of the first preferred aspect of the present invention, the attaching member is formed integrally with the connector holder.

According to a second preferred form of the first preferred aspect of the present invention, the tube connector device further comprises first instant attaching means for instantaneously attaching the connector holder to the panel by engagement with a peripheral portion of the communication hole formed through the panel, the first instant attaching means being provided to an external periphery of one of opposite ends of the tubular body remote from the one of open ends to which the first tube is attached.

In one advantageous arrangement of the above second preferred form of the first aspect of the present invention, the first instant attaching means includes a plurality of tabs which are formed integrally with the tubular body on the external periphery such that the tabs are spaced apart from each other in a circumferential direction of the tubular body.

In an alternative advantageous arrangement of the above second preferred form of the first aspect of the present invention, the first instant attaching means includes a radial extension which is formed integrally with the tubular body on the external periphery such that the radial extension completely surrounds the tubular body.

In the above second preferred form of the first aspect, the first instant attaching means is formed on the external periphery of one of opposite ends of the tubular body remote from the above-indicated one of the open ends to which the first tube is attached. The first instant attaching means may include the plurality of tabs which are formed integrally with the tubular body on the external periphery such that the tabs are spaced apart from each other in a circumferential direction of the tubular body, or alternatively may take the form of the radial extension which is formed integrally with the tubular body on the external periphery such that the radial extension completely surrounds the tubular body. Further, since the tabs or radial extension formed integrally with the tubular body is made of the elastomer or thermoplastic elastomer, the tabs or radial extension can be deformed upon insertion of the tubular body into the communication hole of the panel, and can be restored to its original shape after the insertion so as to be engaged with the peripheral portion of the communication hole. Thus, the connector holder can be instantaneously attached to the panel through the first instant attaching means in the form of the tabs or radial extension.

According to a third preferred form of the first aspect of the present invention, the tube connector device further comprises second instant attaching means for instantaneously attaching the connector holder to the panel by engagement with an engaging hole formed through the panel, the second instant attaching means being fixed to the attaching member.

In the above third preferred form of the first aspect of the present invention, the second instant means is fixed to the attaching member. If the attaching member further includes a portion protruding outwardly from the plate portion, the second instant means may be fixed to the outwardly protruding portion. The engaging hole has to be formed through the panel at a suitable position of the panel, such that the connector holder is fitted into the communication hole of the panel.

In a fourth preferred form of the first aspect of the present invention, the flange portion includes an annular protrusion portion formed on a portion thereof such that the protrusion portion is brought into abutting contact with the panel.

In the above fourth preferred form of the first aspect of the present invention, the annular protrusion portion is formed to the flange portion such that the protrusion portion is brought into abutting contact upon attachment of the connector holder to the panel. Since a clamping force generated by the fixing means concentrates to a contact surface of the protrusion portion and the panel, this arrangement provides a remarkable fluid-tightness between the connector holder and the panel.

In a fifth preferred form of the first aspect of the present invention, the axial hole includes at least one ring-like protrusion portion formed on an internal circumferential surface thereof.

In the above fifth preferred form of the first aspect of the present invention, the at least one ring-like protrusion portion is formed on the internal circumferential surface of the axial hole. According to this arrangement, if only an internal diameter of the ring-like protrusion portion is dimensioned adequately for fitting onto the connector, the device enjoys an remarkable fluid-tightness between the connector holder and the connector. Thus, an internal diameter of the axial hole does not require a dimension of tightened tolerance, but may be enlarged so as to facilitate the insertion of the connector into the axial hole.

In a sixth preferred form of the first aspect of the present invention, the fixing means includes a nut which is fixed to the plate portion, and a bolt which passes through the flange portion so as to be screwed into the nut.

According to a second preferred aspect of the present invention, the tube connector device further comprises an annular rigid member, and wherein the connector holder further includes a folded-back portion which is formed by folding back a peripheral portion of the flange portion inwardly in the radial direction of the connector holder, the rigid member being fitted into an annular groove which is defined by the flange portion and the folded-back portion, so that the folded-back portion is gripped by the annular rigid member and the panel.

In the above second preferred aspect of the invention, when the connector holder is fixedly attached to the panel by the fixing means, the rigid member which is fitted in the annular groove defined by the flange portion and the folded-back portion presses the folded-back portion onto the a surface of the panel, whereby the folded-back portion and the panel adhere to each other, assuring a fluid-tightness between the connector holder and the panel.

According to a first preferred form of the second preferred aspect of the present invention, the rigid member is formed integrally with the connector holder.

According to a second preferred form of the second preferred aspect of the present invention, the tube connector device further comprises instant attaching means for instantaneously attaching the connector holder to the panel by engagement with a peripheral portion of the communication hole formed through the panel, and wherein the annular rigid member includes a plate portion fitted in the annular groove and a tubular portion extending along an external circumferential surface of the tubular body from the plate portion in a direction remote from the one of open ends to which the first tube is attached, and wherein the instant attaching means is provided to the tubular portion.

In the above second preferred form of the second aspect of the present invention, the instant attaching means is provided to the annular rigid member which is fitted in the connector holder. The instant attaching means may include a plurality of tabs for engaging with the peripheral portion of the communication hole of the panel. The plurality of tabs may be formed on an external periphery of the tubular portion of the annular rigid member.

In a third preferred form of the second aspect of the present invention, the folded-back portion includes an annular protrusion portion formed on a portion thereof such that the protrusion portion is brought into abutting contact with the panel.

In a fourth preferred form of the second aspect of the present invention, the axial hole includes at least one ring-like protrusion portion formed on an internal circumferential surface thereof.

In a fifth preferred form of the second aspect of the present invention, the fixing means includes a tapped bush which is provided to the flange portion, and a bolt which passes through the annular rigid member so as to be screwed into the tapped bush.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
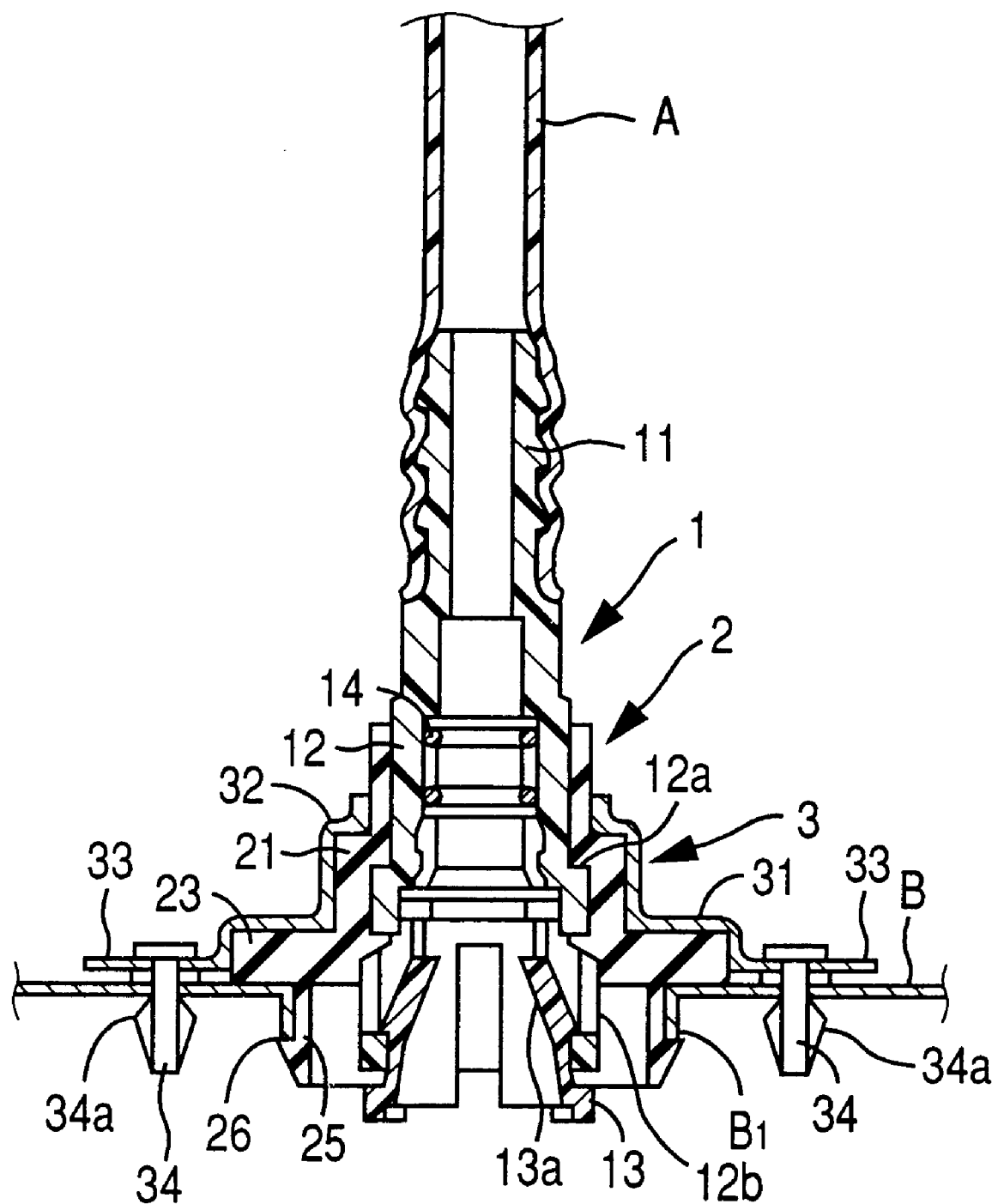
FIG. 1 is an elevational side view in cross section, showing a tube connector device constructed according to a first embodiment of the present invention.
Figure 2:
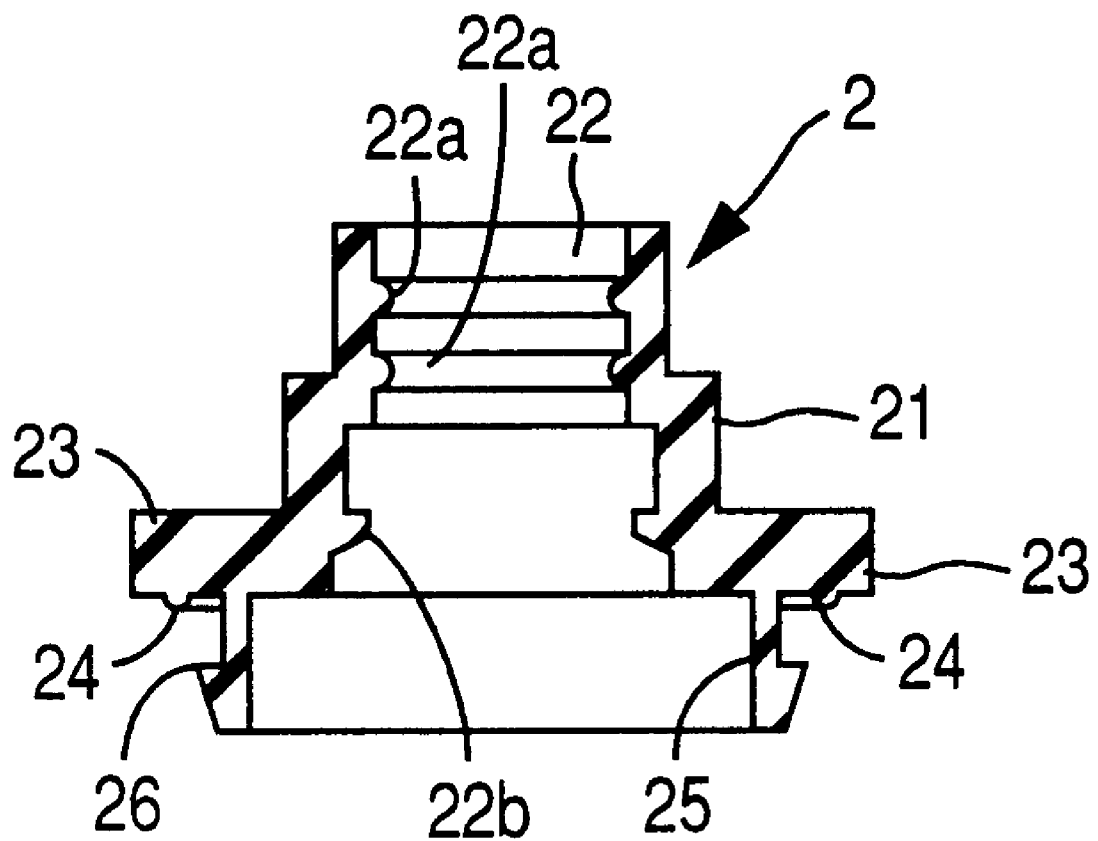
FIG. 2 is an elevational side view in cross section, showing a connector holder of the tube connector device of FIG. 1.
Figure 3:
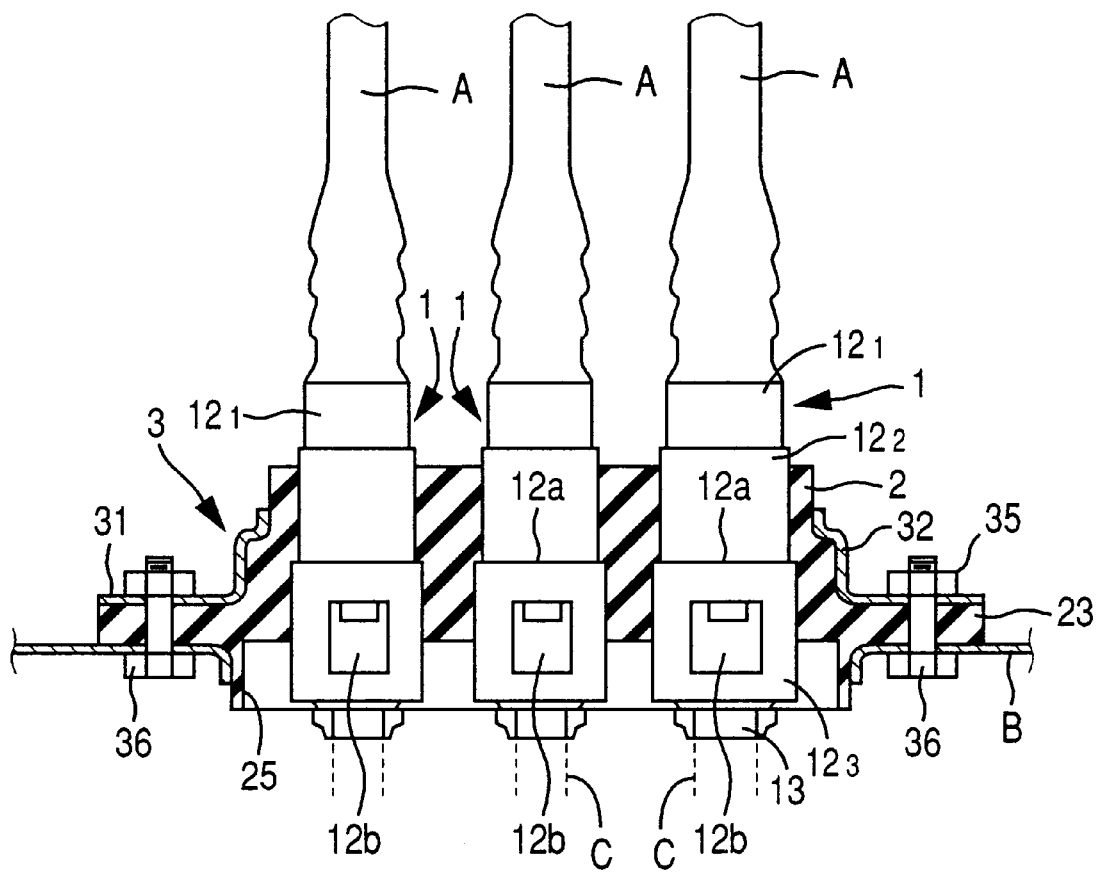
FIG. 3 is an elevational front view partly in cross section, showing the tube connector device of FIG. 1.
Figure 4:
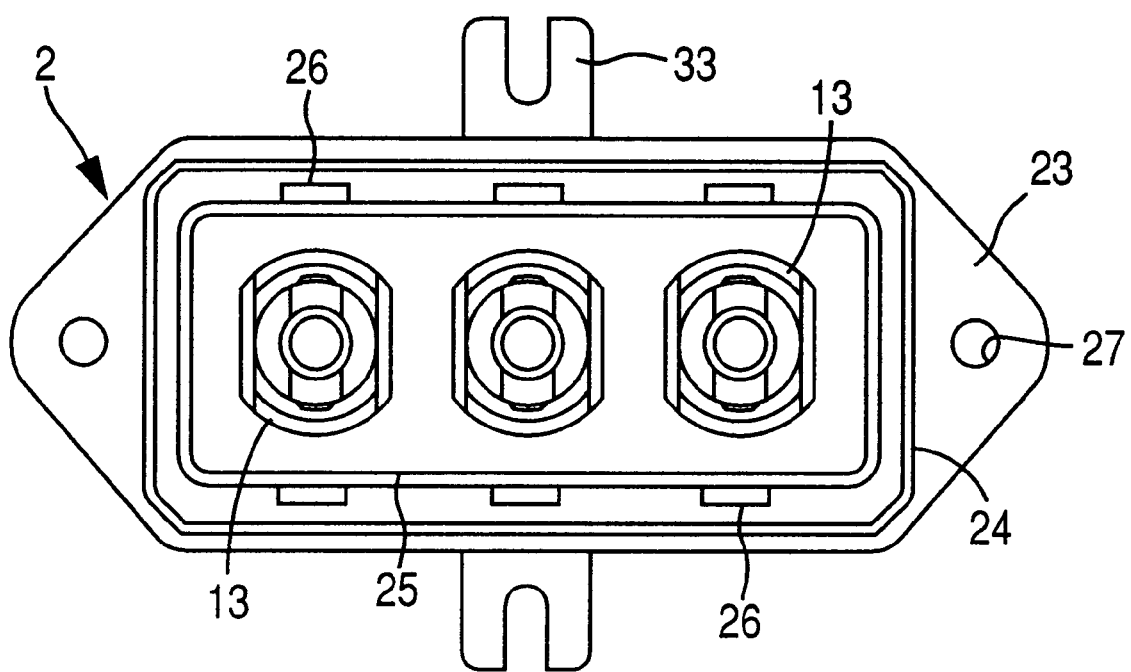
FIG. 4 is a bottom plan view of the connector holder of FIG. 2 with connectors which are held by the connector holder.
Figure 5:
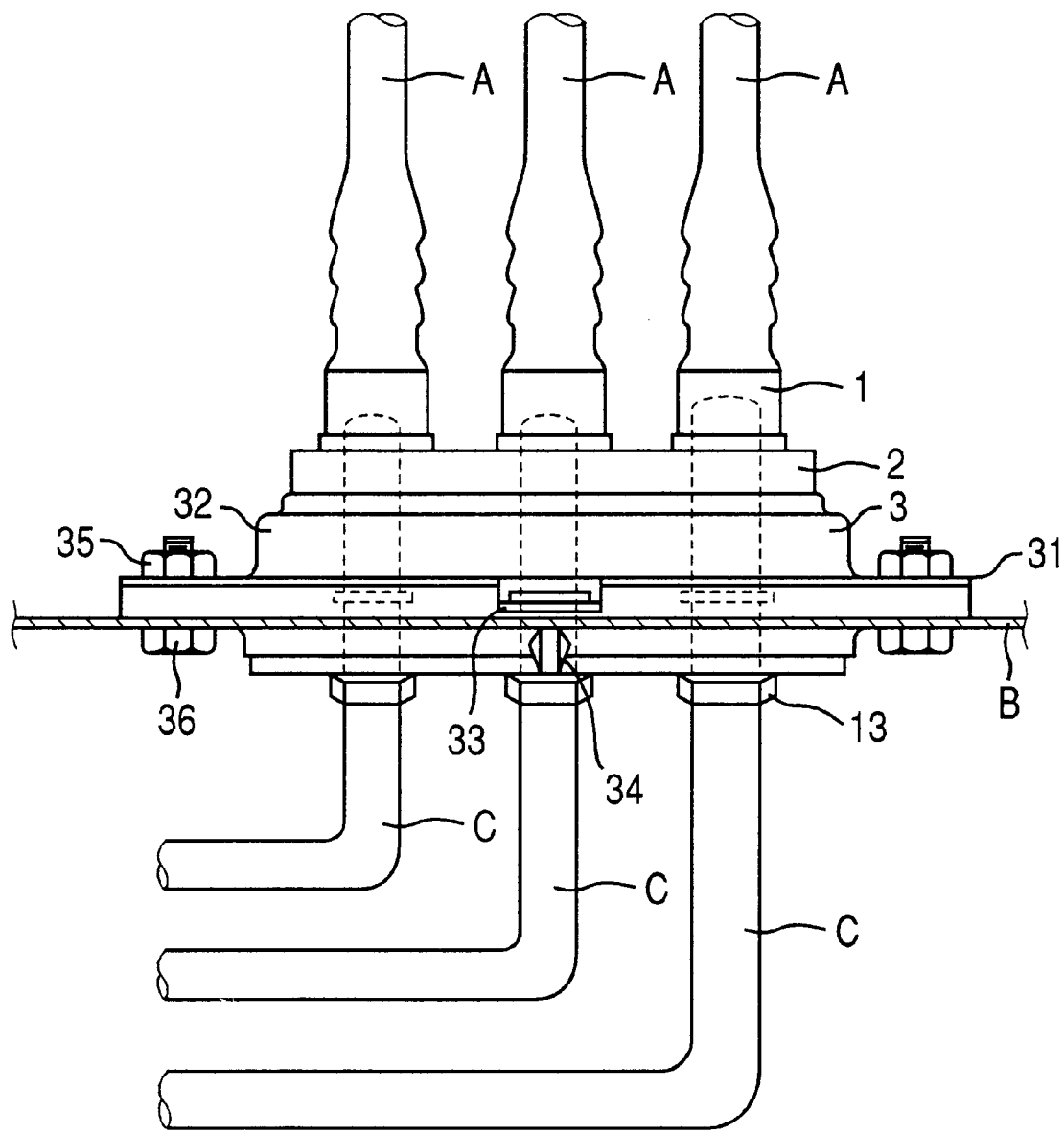
FIG. 5 is an elevational front view, showing the tube connector device of FIG. 1 which is attached to a panel.

Referring to FIGS. 1–5, there will be described a tube connector device constructed according to a first embodiment of the present invention. This tube connector device shown in FIGS. 1 and 3 is designed for a piping system of a fuel tank of a automotive vehicle, and includes a plurality of tubular connectors 1 each of which is connected with a resinous tube A at one of opposite ends thereof, a connector holder 2 for simultaneously holding the connectors 1, and an attaching member 3 for fixedly attaching the connector holder 2 to a floor panel B of the vehicle. The connector 1 is connected with a metallic tube C at the other of opposite ends thereof, after the connector holder 2 is attached to the floor panel B, as shown in FIG. 5.

The connector 1 is of a well-known type made of synthetic resin. The tubular connector 1 includes a connecting end portion 11 formed at the above-described one end thereof (the upper end) and a housing portion 12 formed at the other end thereof (the lower end), such that the connecting end portion 11 and the housing portion 12 are adjacent to each other in an axial direction of the tubular connector 1. The connecting end portion 11 is adapted to connect with the resinous tube A which is distributed to an upper side of the floor panel B. The housing portion 12 consists of a small diameter portion $12_1$, a medium diameter portion $12_2$ whose external diameter is larger than that of the smaller diameter portion $12_1$, and a large diameter portion $12_3$ whose external diameter is larger than that of the medium diameter portion $12_2$. The smaller diameter portion $12_1$ is adjacent to the connecting end portion 11 in the axial direction, while the medium diameter portion $12_2$ is interposed between the smaller diameter portion $12_1$ and the larger diameter portion $12_3$, whereby the diameter of the housing portion 12 is gradually increased in the axial direction from top to bottom. One of opposite end faces of the larger diameter portion $12_3$ remote from the lower end of the tubular connector 1 is referred to as a shoulder portion 12a. The shoulder portion 12a serves as a stopper for positioning the tubular connector 1 relative to the connector holder 2, upon insertion of the tubular connector 1 into the connector holder 2.

The housing portion 12 has a holding element 13, which may be of a well-known type, fitted into the lower end thereof. By simply pushing one end of the metallic tube C which is distributed to a lower side of the floor panel B, into the lower end of the housing portion 12, a radial extension formed on an external circumferential surface of the metallic tube C is brought into engagement with an engaging tab 13a of the holding element 13. That is, the metallic tube C comes to be held by the holding element 13, with a single movement of the tubular connector 1 and the metallic tube C toward each other. The housing portion 12 has, as in the conventional devices, a plurality of O-rings 14 which are disposed on an inner circumferential surface of the medium diameter portion $12_2$, for securing a fluid-tightness between the tubular connector 1 and the metallic tube C.

The connector holder 2 is made of an elastomer such as a suitable synthetic rubber, or alternatively a thermoplastic elastomer, and includes a tubular body 21 and an annular flange portion 23, as shown in FIG. 2. The tubular body 21 has an axial hole 22 for holding the connector 1 such that the tubular connector 1 is fitted in the axial hole 22. The flange portion 23 projects outwardly from the tubular body 21 in a radial direction of the connector holder 2. The tubular connector 1 is inserted into the axial hole 22 from a lower side of the tubular body 21 (a large diameter side of the axial hole 22), whereby the connecting end portion 11 protrudes upwardly from the tubular body 21 while at the same time a major part of the housing portion 12 is accommodated in the tubular body 21.

On a lower side face of the flange portion 23, there is formed an annular guide wall 25 which is fitted in a communication hole formed through the floor panel B. The guide wall 25 has a plurality of flexible tabs 26 formed on an external periphery thereof. The flexible tabs 26 serve as first instant attaching means for instantaneously attaching the connector holder 2 to the floor panel B, by engagement with a peripheral portion $B_1$ of the communication hole of the floor panel B. On the lower side face of the flange portion 23, there is further formed an annular protrusion portion 24 which protrudes downwardly from the lower side face of the flange portion 23, as shown in FIGS. 2 and 4. This annular protrusion portion 24 is brought into abutting contact with the floor panel B, when the connector holder 2 is attached to the floor panel B as shown in FIG. 1, so as to assure a fluid-tightness between the floor panel B and the connector holder 2 for preventing water and/or dust from passing through therebetween.

The axial hole 22 of the connector holder 2 consists of an upper portion and a lower portion. The upper portion has a diameter smaller than that of the lower portion. The upper and lower portions cooperate to form a stepped portion therebetween. The stepped portion is brought into abutting contact with the shoulder portion 12a of the tubular connector 1 which has been inserted into the axial hole 22. The axial hole 22 has a plurality of ring-like protrusion portions 22a formed on an internal circumferential surface of the upper portion. Each of the ring-like protrusion portions 22a protrudes inwardly from the internal circumferential surface in the radial direction by a predetermined distance. The provision of the ring-like protrusion portions 22a on the internal circumferential surface makes it possible to enlarge the internal diameter of the axial hole 22 by a dimension equal to the above-indicated predetermined distance, facilitating the insertion of the tubular connector 1 into the axial hole 22. A fluid-tightness between the connector holder 2 and the connector 1 can be assured by adjusting a internal diameter of the ring-like protrusion portions 22a. Further, it is preferable that the axial hole 22 further has a plurality of tabs 22b formed on an internal circumferential surface of the lower portion. The tabs 22b are adapted to be engaged with engaging apertures 12b which are provided to the large diameter portion $12_3$ of the tubular connector 1, so as to prevent vertical movement of the tubular connector 1 relative to the connector holder 2.

The attaching member 3 which attaches the flange portion 23 of the connector holder 2 to the floor panel B is made of a metallic material or a synthetic resin. The attaching member 3 may be an annular plate corresponding to a contour of the flange portion 23. In the present embodiment, however, the attaching member 3 consists of an annular plate portion 31, a tubular portion 32 and protrusion portions 33, whereby the attaching member 3 is fixed to the connector holder 2 such that the attaching member 3 is positioned relative to the connector holder 2. The annular plate portion 31 takes a shape corresponding to the contour of the flange portion 23. The tubular portion 32 extends upwardly from the annular plate portion 31 in a direction perpendicular to the annular plate portion 31 along the tubular body 21 of the connector holder 2, so as to surround the external circumferential surface of the tubular body 21. The protrusion portions 33 protrude outwardly from respective opposite sides of the annular plate portion 31, as shown in FIGS. 1 and 4. To each of the protrusion portions 33, second instant attaching means in the form of a fastener 34 is attached. The fastener 34 has tabs 34a which are engageable with a peripheral portion of an engaging hole formed through the floor panel B.

In the present embodiment, the fastener 34 which is available in the market is employed as the second instant attaching means for instantaneously attaching the connector holder 2 to the floor panel B. However, the fastener 34 may be substituted by some other type of instant attaching means such as a suitable clip, provided the substitute is engageable with the floor panel B. Further, while the first and second instant attaching means are provided to the connector holder 2 and the attaching member 3, respectively, in the present embodiment, one of these two instant attaching means may not be provided. The flange portion 23 of the connector holder 2 has through-holes 27 each of which is formed through one of longitudinally opposite end portions of the flange portion 23, as shown in FIG. 4. The connector holder 2 is fixedly attached to the floor panel B by suitable bolts which are adapted to pass through the respective through-holes 27.

For assembling the present tube connector device, first, the attaching member 3 is fitted onto the connector holder 2 shown in FIG. 2, while the tubular connector 1 is fitted into the axial hole 22 of the connector holder 2. Then, the resinous tube A is connected to the connecting end portion 11 which projects upwardly from the connector holder 2, as shown in FIG. 1.

Thus, all of the plurality of connectors 1 to be connected with the respective resinous tubes A can be easily attached to the single connector holder 2. After the connectors 1 has been attached to the connector holder 2, it is possible to handle the plurality of resinous tubes A and the plurality of tubular connectors 1 as a single piece. Besides, the attached connectors 1 can be easily removed from the connector holder 2. Therefore, for example, in a case where some of the tubes A or tubular connectors 1 need to be replaced by other ones or new ones in the factory or field, due to an error committed in the assembly work or a deterioration thereof, the tubes A or tubular connectors 1 can be easily removed from the connector holder 2 so as to be replaced.

Secondly, the guide wall 25 of the connector holder 2 is inserted into the communication hole of the floor panel B with a downward movement of the connector holder 2 towards the floor panel B, and then the first instant attaching means in the form of the flexible tabs 26 formed on the guide wall 25 is brought into engagement with the peripheral portion $B_1$ of the communication hole of the floor panel B, while at the same time the second instant attaching means in the form of the tabs 34a of the fastener 34 which is attached to the protrusion portion 33 of the attaching member 3 is brought into engagement with the peripheral portion of the engaging hole formed through the floor panel B, whereby the connector holder 2 is instantaneously attached to the floor holder B.

As shown in FIG. 3, the annular plate portion 31 of the attaching member 3 is provided with through-holes in respective positions each of which is vertically aligned with one of the through-holes 27 which are formed through the flange portion 23 of the connector holder 2. Then, ordinary nuts 35 each having an internal thread formed on an internal circumferential surface thereof are fixed to the annular plate portion 31 by a suitable welding, such that an axial center of each of the nuts 35 is aligned with that of one of the though-holes formed through the annular plate portion 31. Thus, the connector holder 2 is fixedly attached to the floor panel B, by inserting bolts 36 into the respective through-holes from the lower side of the floor panel B and screwing the bolts 36 upwardly into the respective nuts 35 fixed to the attaching member 3. When the connector holder 2 is fixedly attached to the floor panel B, the annular protrusion portion 24 formed on the flange portion 23 of the connector holder 2 is brought into abutting contact with the floor panel B and at the same time the annular plate portion 31 of the attaching member 3 is downwardly biased by a screw force generated by the bolts 36, whereby the connector holder 2 and the floor panel B are firmly secured to each other, providing a remarkable fluid-tightness between the floor panel B and the connector holder 2.

Lastly, the metallic tubes C are inserted through the lower ends of the respective tubular connectors 1 into the connectors 1 which are held by the connector holder 2, so that the resinous tubes A are connected with the respective metallic tubes C. As shown in FIG. 5, with a single movement of the tubular connector 1 and the metallic tube C towards each other, the radial extension formed on the external circumferential surface of the metallic tube C is brought into engagement with the engaging tabs 13a of the corresponding holding element 13. That is, the plurality of resinous tubes A and the respective metallic tube C are easily connected with each other.

Referring to FIGS. 6–10, there will be described a tube connector device constructed according to a second embodiment of the present invention. This tube connector device includes a connector holder 4 and an attaching member 5 which functionally correspond to the connector holder 2 and the attaching member 3 of the above-described device of the first embodiment, respectively. However, there are some differences in construction between the connector holders 4 and 2, and so are there between the attaching members 5 and 3. In the other components of the device according to the present second embodiment, the present device is identical with the device of the first embodiment. The same reference numerals as used in the first embodiment will be used to identify the identical elements, and redundant description of these elements of the present device will not be provided.

Figure 7:
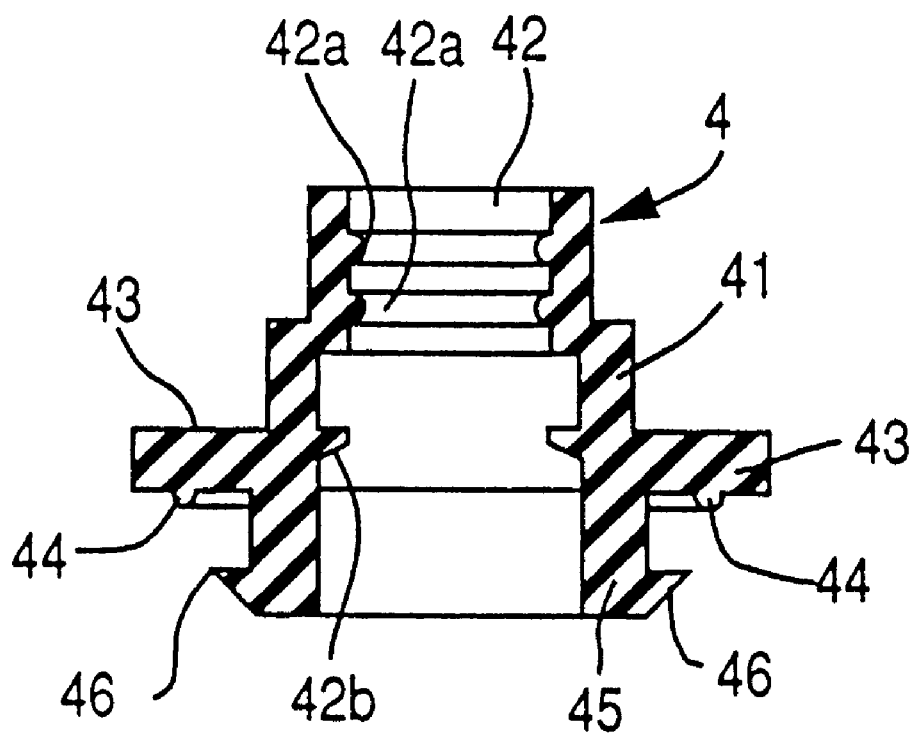
FIG. 7 is an elevational side view in cross section, showing a connector holder of the tube connector device of FIG. 6.
Figure 9:
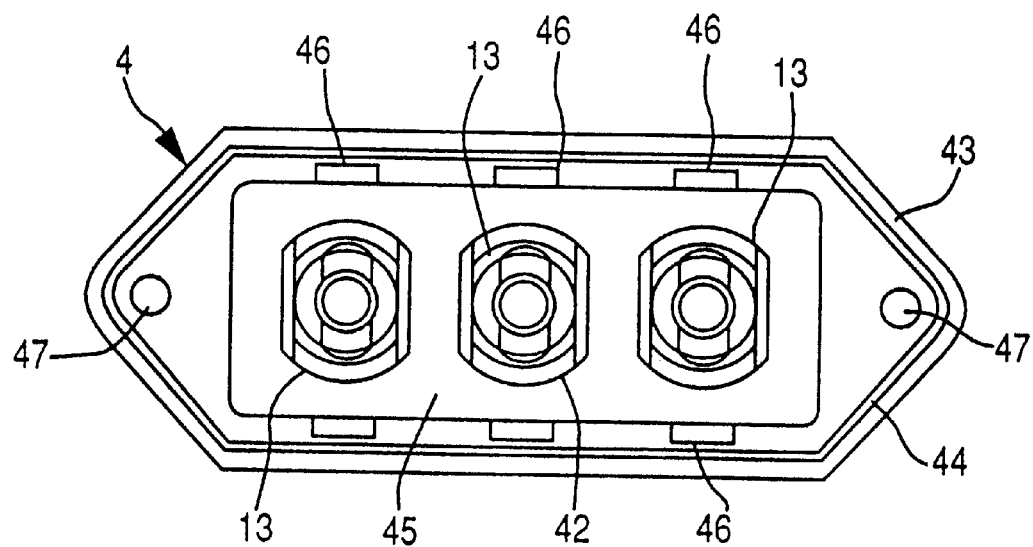
FIG. 9 is a bottom plan view of the connector holder of FIG. 7 with connectors which are held by the connector holder.
Figure 10:
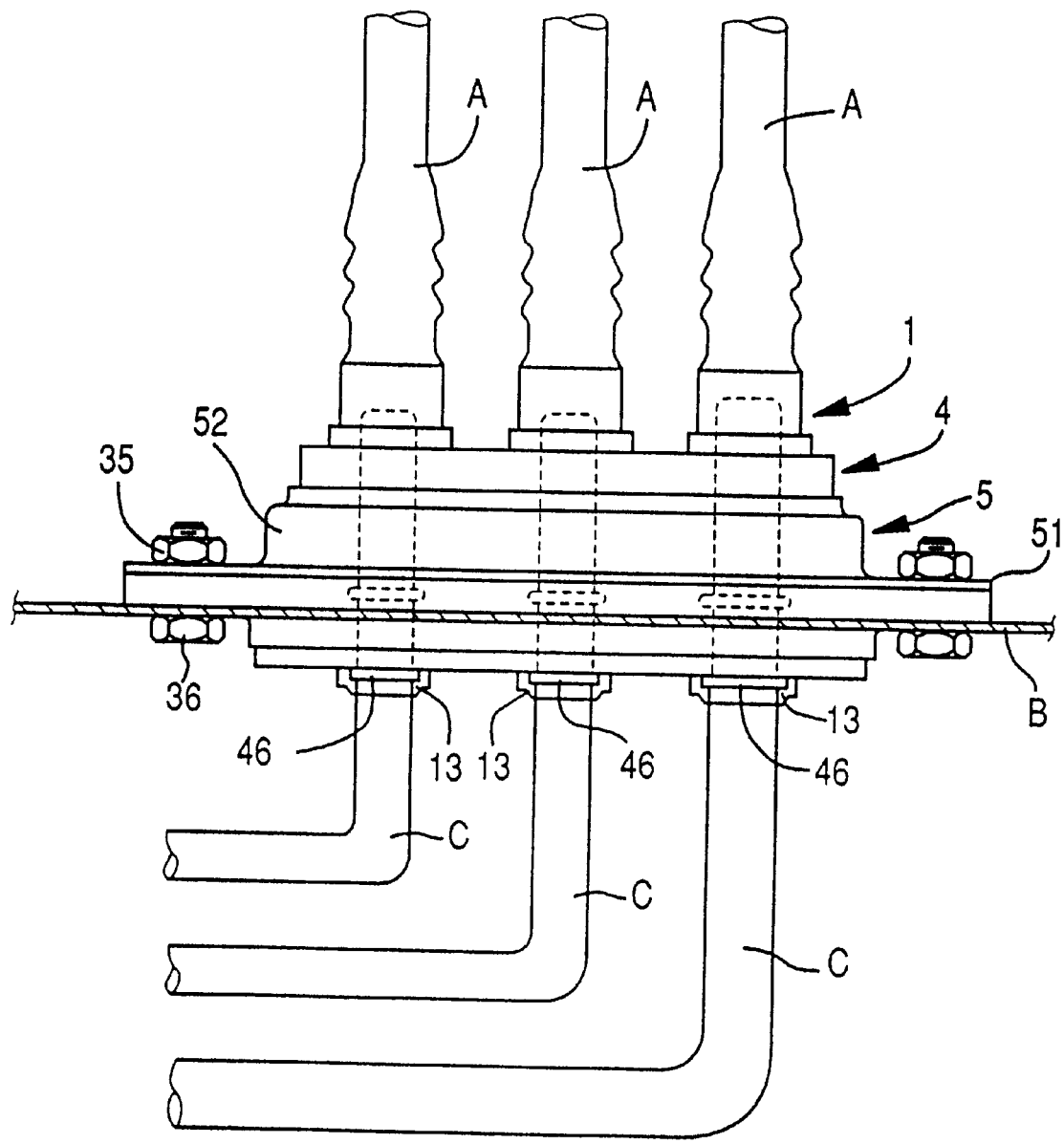
FIG. 10 is an elevational front view, showing the tube connector device of FIG. 6 which is attached to the panel.

The connector holder 4 includes a tubular body 41 and an annular flange portion 43, as shown in FIG. 7. The tubular body 41 has an axial hole 42 for holding the connector 1 such that the tubular connector 1 is fitted in the axial hole 42. The flange portion 43 projects outwardly from the tubular body 41 in a radial direction of the connector holder 4. On a lower side face of the flange portion 43, there is formed a guide portion 45 which is fitted in a communication hole of the the floor panel B. The guide portion 45 has a plurality of tabs 46 formed on an external periphery of a lower end thereof such that the tabs 46 are spaced apart from each other in a circumferential direction of the tubular body 41. The tabs 46 serve as first instant attaching means for instantaneously attaching the connector holder 4 to the floor panel B, with engagement with a peripheral portion $B_1$ of the communication hole of the floor panel B. On the lower side face of the flange portion 43, there is further formed an annular protrusion portion 44 which protrudes downwardly from the lower side face of the flange portion 43, as shown in FIGS. 7 and 9. The flange portion 43 has through-holes 47 each of which is formed through one of longitudinally opposite end portions of the flange portion 43, as shown in FIG. 9. The connector holder 4 is fixedly attached to the floor panel B by the bolts 36 which are adapted to pass through the respective through-holes 47.

The axial hole 42 consists of an upper portion and a lower portion whose diameter is larger than that of the upper portion. The axial hole 42 has a plurality of ring-like protrusion portions 42a formed on an internal circumferential surface of the upper portion. The axial hole 42 further has a plurality of tabs 42b formed on an internal circumferential surface of the lower portion. The tabs 42b are adapted to be engaged with engaging apertures 12b which are provided to the large diameter portion $12_3$ of the tubular connector 1.

Figure 6:
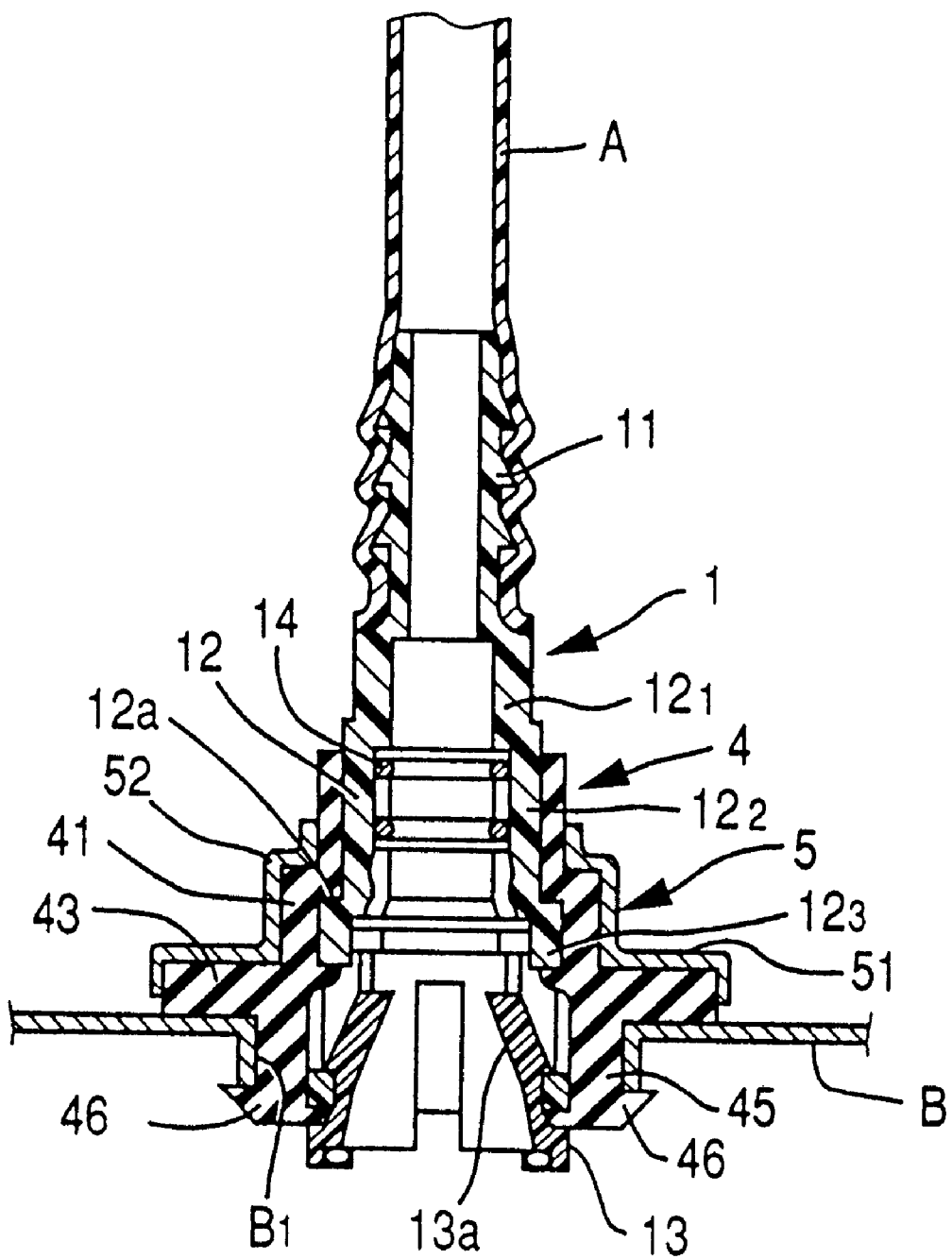
FIG. 6 is an elevational side view in cross section, showing a tube connector device constructed according to a second embodiment of the present invention.
Figure 8:
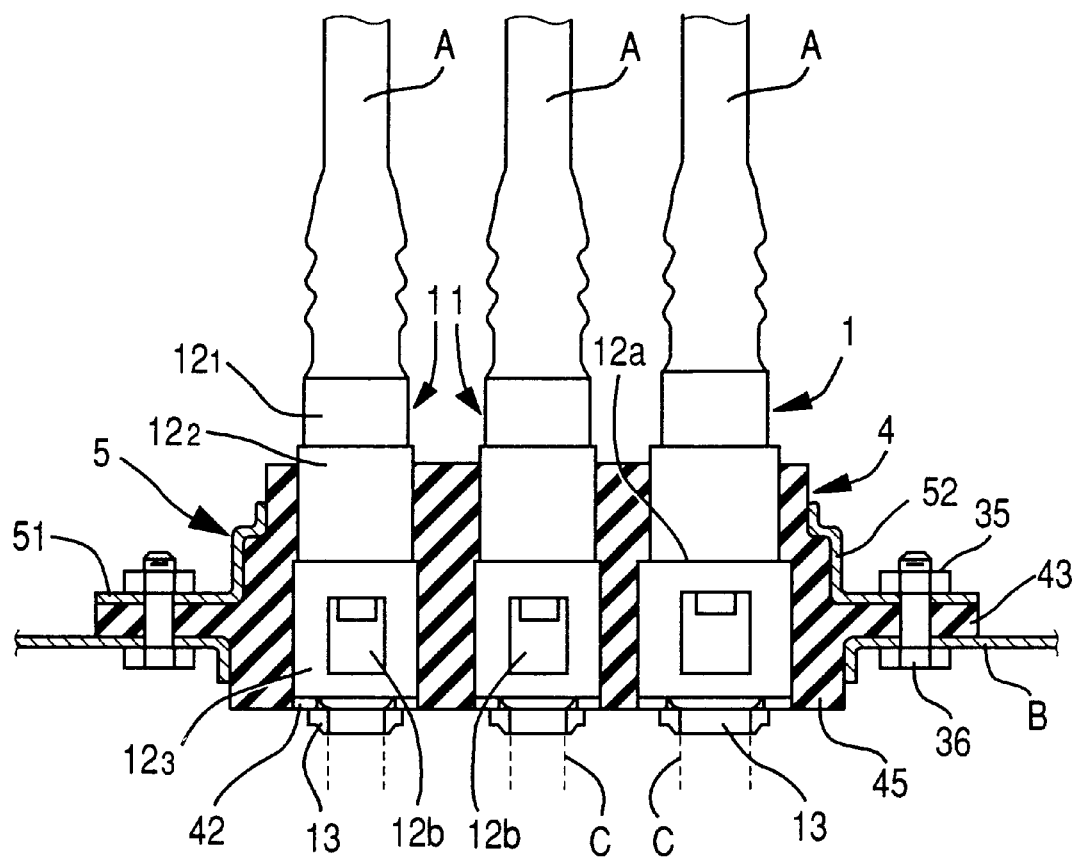
FIG. 8 is an elevational front view partly in cross section, showing the tube connector device of FIG. 6.

The attaching member 5 consists of an annular plate portion 51 and a tubular portion 52, as shown in FIGS. 6 and 8. The annular plate portion 51 takes a shape corresponding to the contour of the flange portion 43. The tubular portion 52 extends upwardly from the annular plate portion 51 in a direction perpendicular to the annular plate portion 51 along the tubular body 21 of the connector holder 2, so as to surround the external circumferential surface of the tubular body 21.

Figure 11:
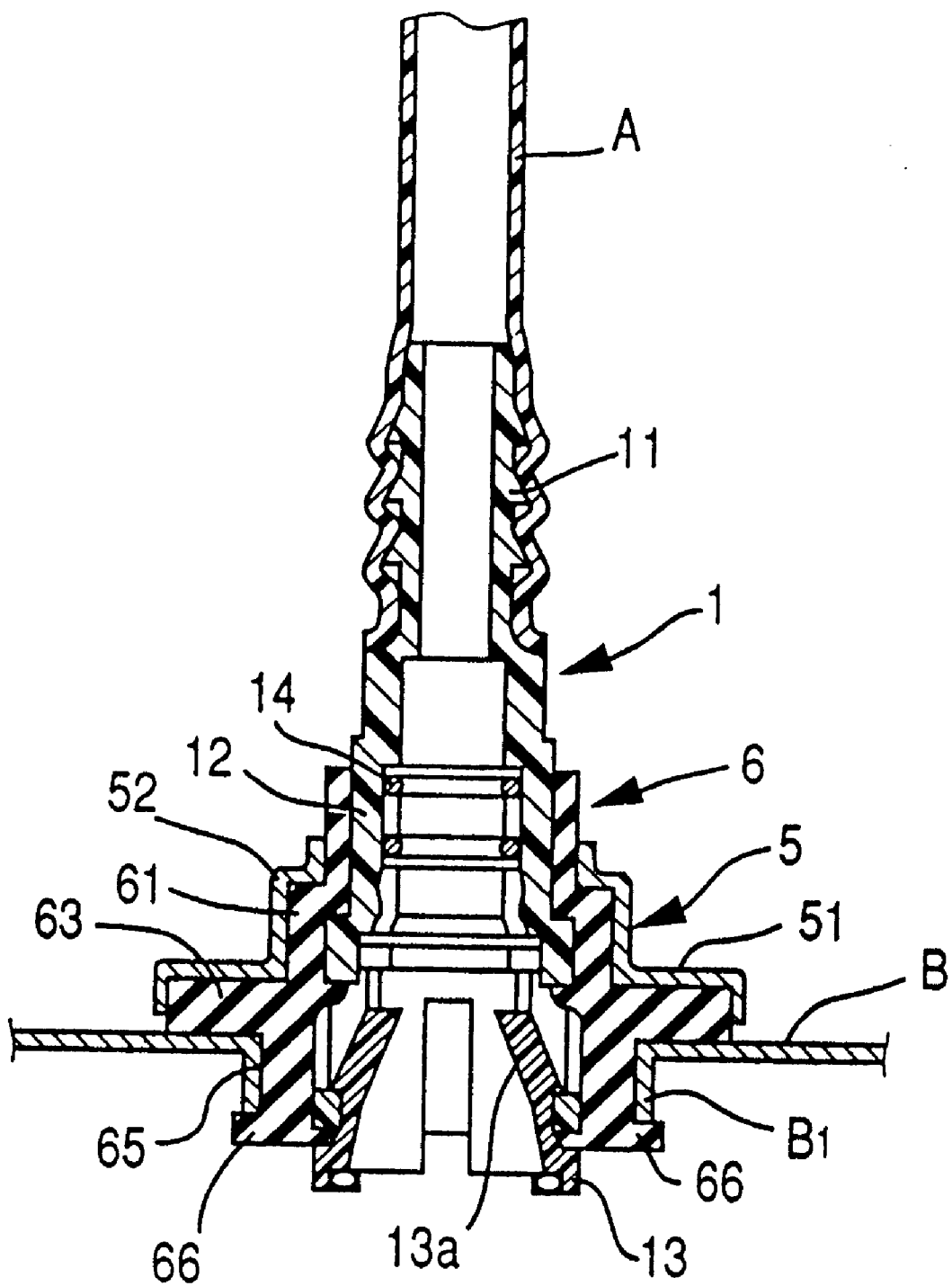
FIG. 11 is an elevational side view in cross section, showing a tube connector device constructed according to a third embodiment of the present invention.
Figure 12:
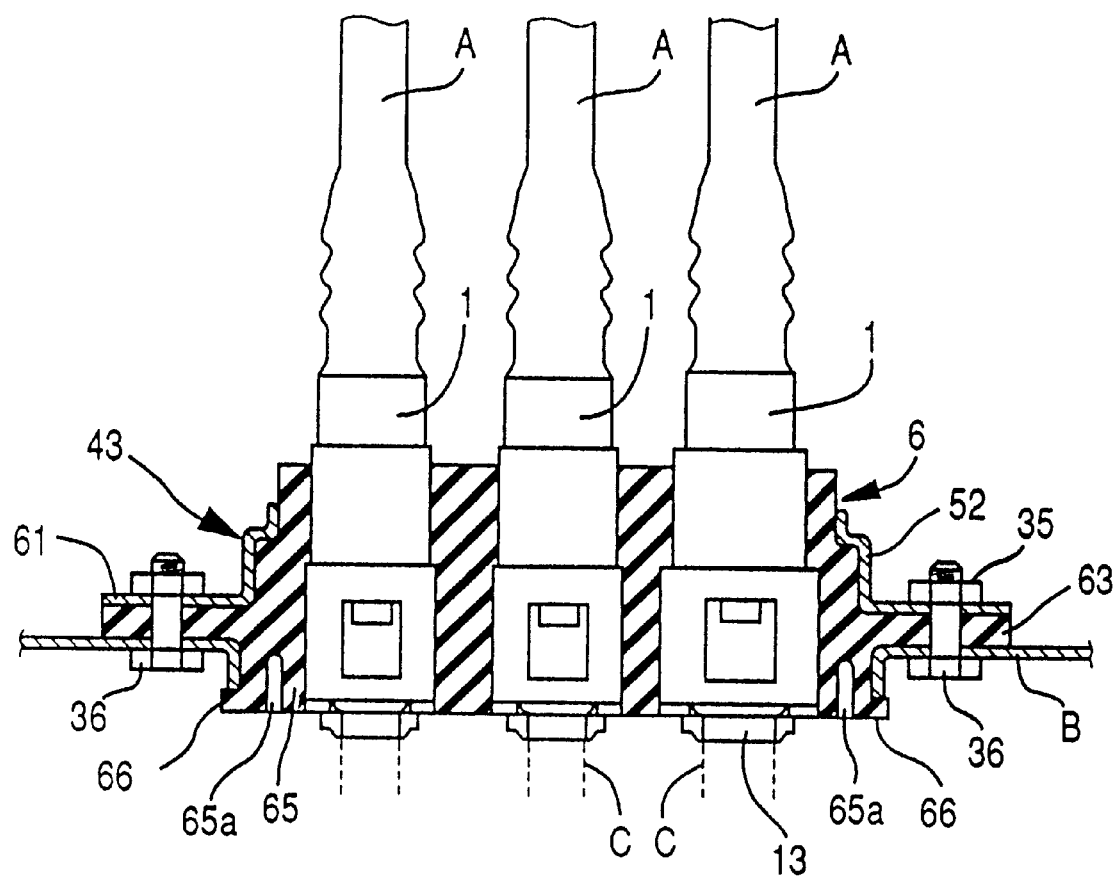
FIG. 12 is an elevational front view partly in cross section, showing the tube connector device of FIG. 11.
Figure 13:
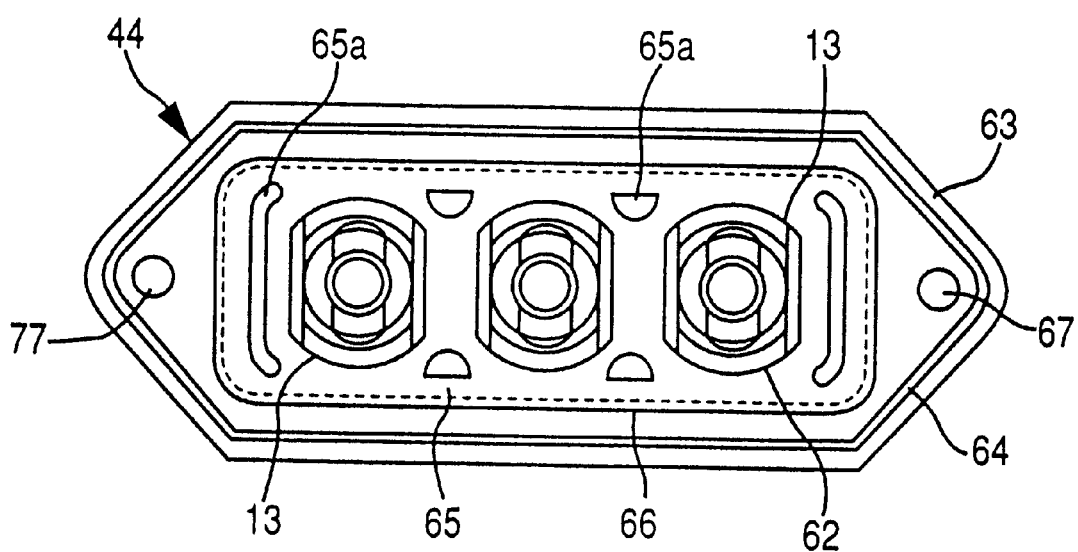
FIG. 13 is a bottom plan view of the connector holder of FIG. 11 with connectors which are held by the connector holder.

Referring to FIGS. 11–13, there will be described a tube connector device constructed according to a third embodiment of the present invention. This tube connector device includes a connector holder 6 which functionally corresponds to the connector holder 4 of the above-described device of the second embodiment. However, there are some differences in construction between the connector holders 6 and 4. In the other components of the device according to the present third embodiment, the present device is identical with the device of the second embodiment. The same reference numerals as used in the second embodiment will be used to identify the identical elements, and redundant description of these elements of the present device will not be provided.

The connector holder 6 includes a tubular body 61 and an annular flange portion 63, as shown in FIG. 11. The tubular body 61 has an axial hole 62 for holding the connector 1 such that the connector 1 is fitted in the axial hole 62, as shown in FIG. 13. The flange portion 63 projects outwardly from the tubular body 61 in a radial direction of the connector holder 6. On a lower side face of the flange portion 63, there is formed a guide portion 65 which is fitted in a communication hole of the the floor panel B. The guide portion 65 has a radial extension 66 formed integrally with the guide portion 65 on an external periphery of a lower end thereof such that the radial extension 66 completely surrounds the guide portion 65. The radial extension 66 serves as first instant attaching means for instantaneously attaching the connector holder 6 to the floor panel B, by engagement with a peripheral portion $B_1$ of the communication hole of the floor panel B. On the lower side face of the flange portion 63, there is further formed an annular protrusion portion 64 which protrudes downwardly from the lower side face of the flange portion 63. The flange portion 63 has through-holes 67 each of which is formed through one of longitudinally opposite end portions of the flange portion 63, as shown in FIG. 13. The connector holder 6 is fixedly attached to the floor panel B by the bolts 36 which are adapted to pass through the respective through-holes 67.

On an internal circumferential surface of the axial hole 62, there are formed a plurality of ring-like protrusion portions and a plurality of tabs which are identical with the the ring-like protrusion portions 42a and the tabs 42b, respectively, of the above-described device according to the second embodiment. On a lower end face of the guide portion 65, there are formed a plurality of blind holes 65a such that the blind holes 65a do not interfere with the axial holes 62. The blind holes 65a facilitates the guide portion 65 to be radially inwardly contracted or deformed upon insertion of the tubular body 61 into the communication hole of the panel B, so that the insertion is easily achieved by a reduced force.

Referring to FIGS. 14–18, there will be described a tube connector device constructed according to a fourth embodiment of the present invention. This tube connector device includes a connector holder 7 and a rigid member 8 which functionally correspond to the connector holder 6 and the attaching member 5 of the above-described device of the third embodiment, respectively. However, there are differences in construction between the connector holders 7 and 6, and so are there between the rigid member 8 and the attaching members 5. In the other components of the device according to the present fourth embodiment, the present device is identical with the device of the third embodiment. The same reference numerals as used in the third embodiment will be used to identify the identical elements, and redundant description of these elements of the present device will not be provided.

Figure 14:
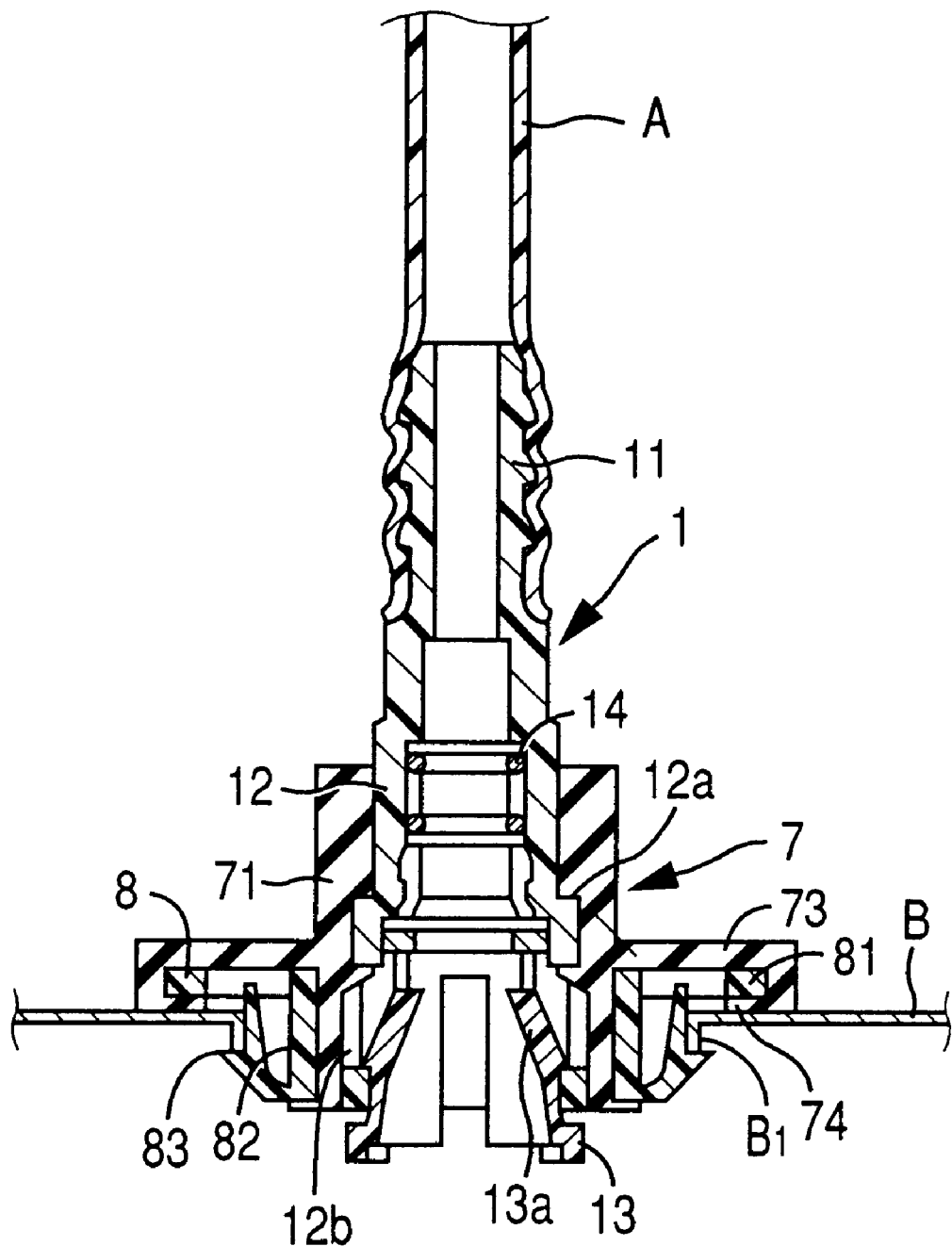
FIG. 14 is an elevational side view in cross section, showing a tube connector device constructed according to a fourth embodiment of the present invention.
Figure 15:
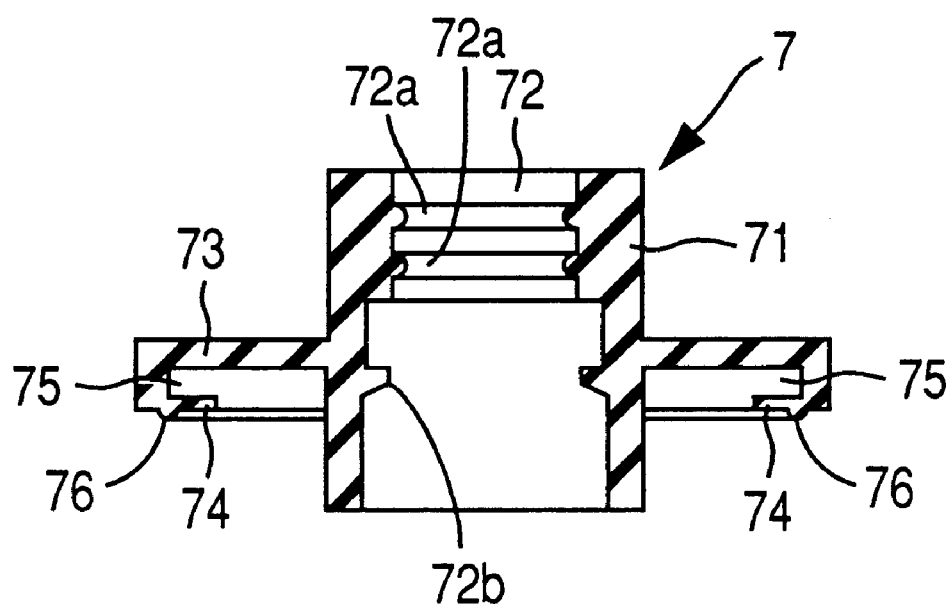
FIG. 15 is an elevational side view in cross section, showing a connector holder of the tube connector device of FIG. 14.
Figure 17:
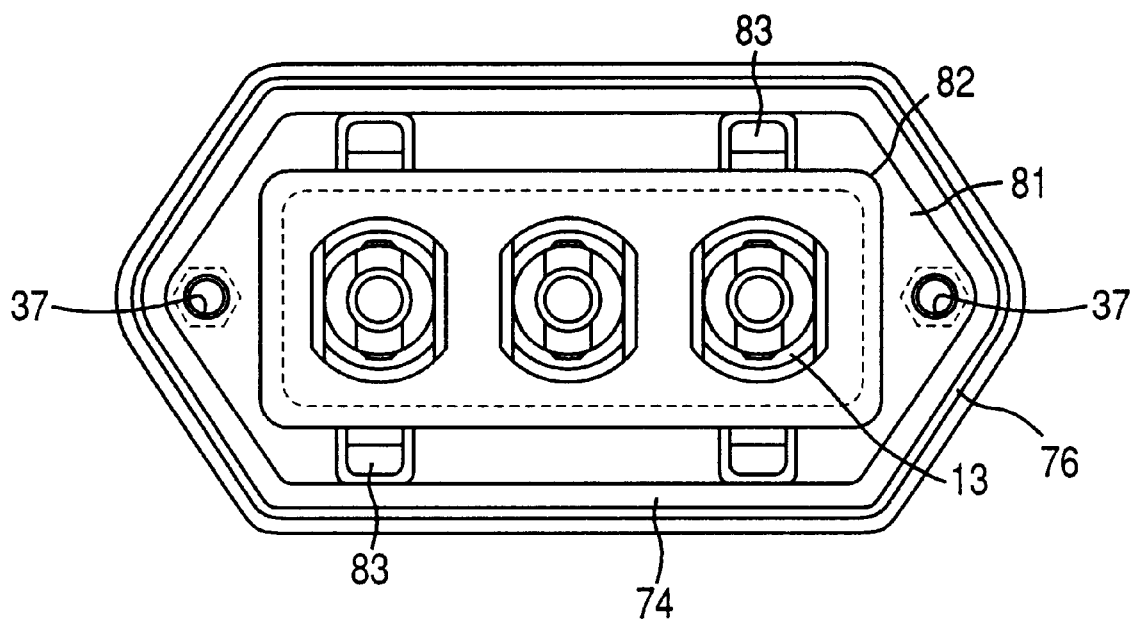
FIG. 17 is a bottom plan view of the connector holder of FIG. 15 with connectors which are held by the connector holder.
Figure 18:
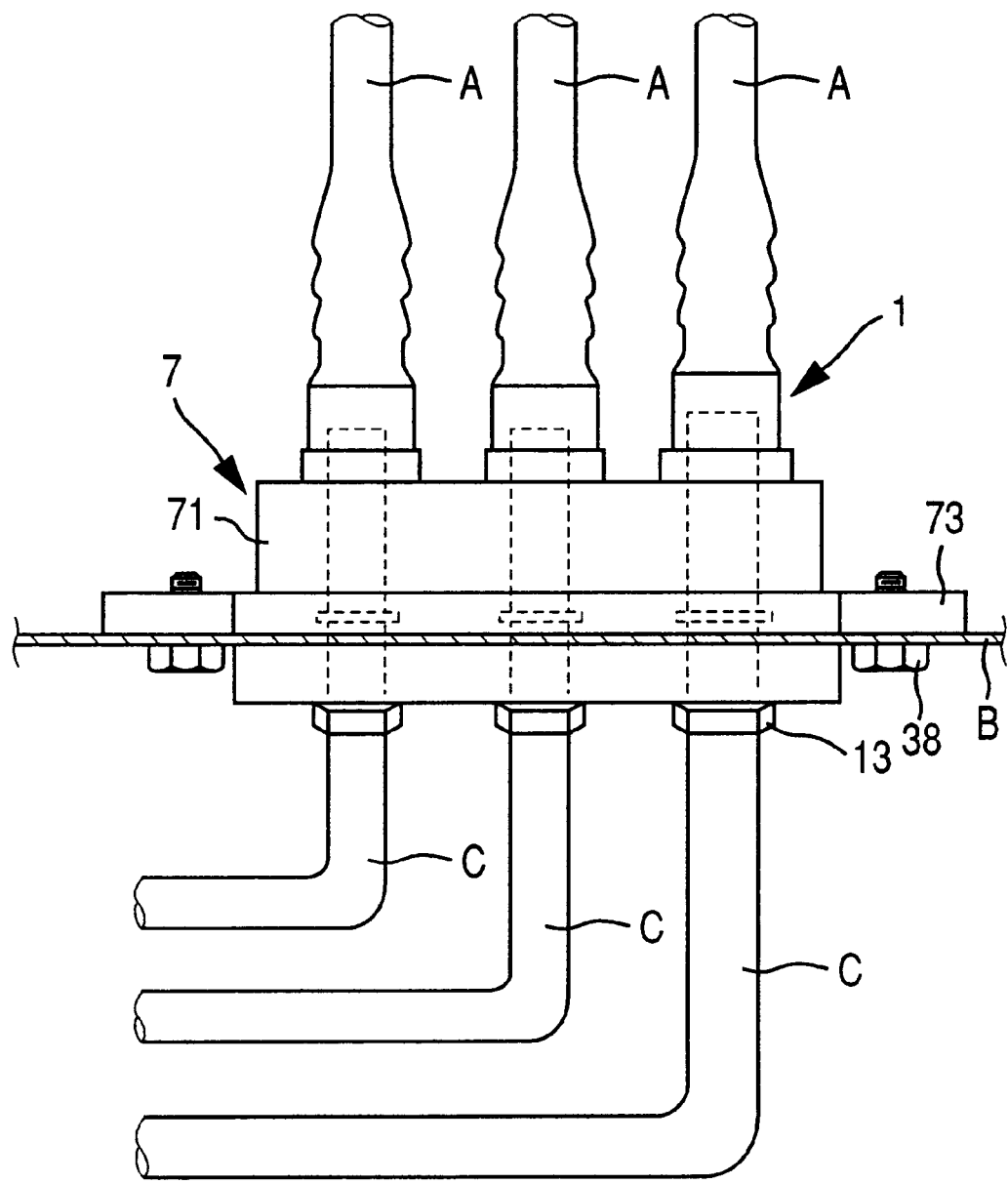
FIG. 18 is an elevational front view, showing the tube connector device of FIG. 14 which is attached to the panel.

The connector holder 7 includes a tubular body 71, an annular flange portion 73 and a folded-back portion 74, as shown in FIG. 14. The tubular body 71 includes an axial hole 72 for holding the connector 1 such that the connector 1 is fitted in the axial hole 72. The flange portion 73 has through-holes each of which is formed through one of longitudinally opposite end portions of the flange portion 73, as shown in FIG. 17. The folded-back portion 74 is formed by folding back a peripheral portion of the flange portion 73 inwardly in a radial direction of the connector holder 7. The rigid member 8 having an annular shape is fitted in an annular groove 75 which is defined by the flange portion 73 and the folded-back portion 74, so that the folded-back portion 74 is gripped by the rigid member 8 and the floor panel B. On a lower side face of the folded-back portion 74, there is formed an annular protrusion portion 76 as shown in FIG. 15, such that the annular protrusion portion 76 is brought into abutting contact with the panel B when the connector holder 7 is attached to the floor panel B. This arrangement assures a remarkable fluid-tightness between the connector holder 7 and the floor panel B.

The axial hole 72 consists of an upper portion and a lower portion whose diameter is larger than that of the upper portion. The axial hole 72 has a plurality of ring-like protrusion portions 72a formed on an internal circumferential surface of the upper portion. The axial hole 72 further has a plurality of tabs 72b formed on an internal circumferential surface of the lower portion. The tabs 72b are adapted to be engaged with the engaging apertures 12b which are provided to the large diameter portion $12_3$ of the connector 1.

The rigid member 8, which is made of a metallic material or a synthetic resin, consists of an annular plate portion 81 which is fitted into the annular groove 75 and a tubular portion 82 which extends downwardly from the annular plate portion 81 in a direction perpendicular to the annular plate portion 81 along the tubular body 71 of the connector holder 7, so as to surround an external circumferential surface of the tubular body 71. The tubular portion 82 has a plurality of flexible tabs 83 formed on an external periphery thereof. The flexible tabs 83 serve as a third instant attaching means for instantaneously attaching the connector holder 7 to the floor panel B, by engagement with a peripheral portion $B_1$ of the communication hole of the floor panel B.

Figure 16:
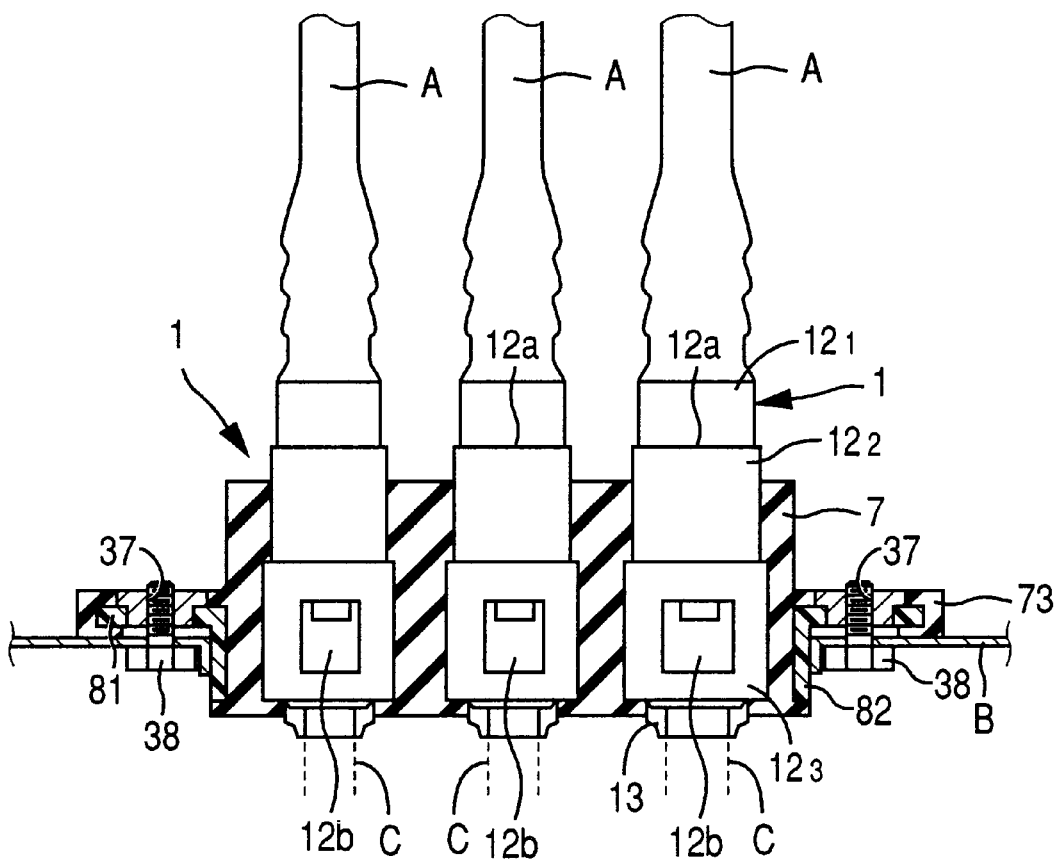
FIG. 16 is an elevational front view partly in cross section, showing the tube connector device of FIG. 14.

As shown in FIG. 16, the annular plate portion 81 of the rigid member 8 is provided with tapped bushes 37 made of a rigid resin in respective positions each of which is vertically aligned with one of the above-described through-holes formed through the flange portion 73 of the connector holder 7. Thus, the connector holder 7 is fixedly attached to the floor panel B, by inserting bolts 38 into the respective through-holes of the annular plate portion 81 from the lower side of the floor panel B and screwing the bolts 38 upwardly into the respective tapped bushes 37 fixed in the annular plate portion 81 of the rigid member 8. When the connector holder 7 is fixedly attached to the floor panel B, the annular protrusion portion 76 provided to the folded-back portion 74 of the flange portion 73 of the connector holder 7 is brought into abutting contact with the floor panel B and at the same time the annular plate portion 81 of the rigid member 8 is downwardly biased by a screw force generated by the bolts 38, whereby the connector holder 7 and the floor panel B are firmly secured to each other, providing a remarkable fluid-tightness between the floor panel B and the connector holder 7.

In each of the tube connector devices described above, since the connector holder 2 (4, 6, 7) is made of an elastomer or a thermoplastic elastomer, it is possible to assure a fluid-tightness for preventing water and/or dust from passing through between the connector holder 2 (4, 6, 7) and the connectors 1 and between the connector holder 2 (4, 6, 7) and the floor panel (B), without interposing a particular sealing member therebetween. Thus, the device can have a simple construction constituted by a reduced number of component parts, and can be cheaply produced.

Further, in each of the above-described devices, the plurality of connectors 1 are concurrently held by the single connector holder 2 (4, 6, 7). Thus, the device is suitable for concurrently connecting a plurality of tubes in a tubing system for a fuel tank of an automotive vehicle.

While the presently preferred embodiments of this invention has been described above by reference to the accompanying drawings, it is to be understood that the present invention is not limited to the details of the illustrated embodiments, but may be otherwise embodied.

For instance, the first embodiment employs the first instant attaching means in the form of the flexible tabs 26 formed on the connector holder 2 and the second instant attaching means in the form of the fasteners 34 fixed to the attaching member 3, for instantaneously attaching the connector holder 2 to the floor panel B. However, both of the two instant attaching means do not have to be necessarily employed, but one of the two means may be saved.

Further, in the first embodiment, the fasteners 34 are provided to the respective protrusion portions 33 protruding outwardly from respective opposite sides of the annular plate portion 31. However, the second instant attaching means may be fixed to the annular plate portion 31 so as to pass through the attaching member 3 and the connector holder 2 for thereby engaging with the peripheral portion $B_1$ of the communication hole of the floor panel B.

In the first, second, third and fourth embodiments, the resinous tubes A and the metallic tubes C are connected with each other such that the attitudes of the tubes A, C are held substantially perpendicular to the floor panel B. However, the attitudes of the tubes A, C do not have to be necessarily held substantially perpendicular to the floor panel B. The tubes A, C may be connected with each other such that the tubes A, C extends at a non-right angle with respect to the floor panel B, by changing an angle of the axial holes 22 (42, 62, 72) relative to the flange portion 23 (43, 63, 73).

In the first, second and third embodiments, the connector holder 2 (4, 6) is fixedly attached to the floor panel B, by inserting the bolts 36 into the respective through-holes from the lower side of the floor panel B and screwing the bolts 36 upwardly into the respective nuts 35 which are previously fixed to the annular plate portion 31 (51) of the attaching member 3 (5). However, the bolts 36 may be previously fixed to the annular plate portion 31 (51), so that the connector holder 2 (4, 6) is fixedly attached to the floor panel B by screwing the nuts 35 upwardly onto the respective bolts 36 from the lower side of the floor panel B.

Further, the connector holder 2 (4, 6) and the attaching member 3 (5) in the first, second and third embodiments may be assembled together, or alternatively, the connector holder 2 (4, 6) may be formed integrally with the attaching member 3 (5). In the latter case, the attaching member 3 (5) which has been previously formed is positioned in a cavity of mold, and then a thermoplastic elastomer as the material for the connector holder 2 (4, 6) is injected into the cavity, whereby an integral assembly of the connector holder 2 (4, 6) and the attaching member 3 (5) is obtained. As an example of the thermoplastic elastomer, there is available a polymer-alloy which includes polypropylene and EPDM and which has a Shore A hardness of 75, such as Santoprene 101-75 produced by Advanced Elastomer Systems Japan Ltd.

In the fourth embodiment, the connector holder 7 is fixedly attached to the floor panel B, by inserting the bolts 38 into the respective through-holes of the annular plate portion 81 from the lower side of the floor panel B and screwing the bolts 38 upwardly into the respective tapped bushes 37 fixed in the flange portion 73. However, suitable bolts may be previously attached to the flange portion 73, so that the connector holder 7 is fixedly attached to the floor panel B by screwing suitable nuts upwardly onto the respective bolts from the lower side of the floor panel B.

Further, in the fourth embodiment, the rigid member 8 consists of the annular plate portion 81 and the tubular portion 82. However, the rigid member 8 may consist of only the annular plate portion 81, whereby tabs as the instant attaching means may be formed integrally with the tubular body 71 of the connector holder 7 made of an elastomer or a thermoplastic elastomer. Besides, while the rigid member 8 in the fourth embodiment takes an annular shape, the rigid member 8 may take some other shape. For example, the annular plate portion 81 is provided with two ribs formed integrally therewith. Each of the ribs extends in a lateral direction of the annular plate portion 81 for thereby connecting laterally opposite end portions of the plate portion 81, such that the rib does not interfere the connectors 1.

Still further, the connector holder 7 and the rigid member 8 in the fourth embodiment may be assembled together, or alternatively, the connector holder 7 may be formed integrally with the rigid member 8. In the latter case, the rigid member 8 which has been previously formed is positioned in a cavity of mold, and then a thermoplastic elastomer as the material for the connector holder 7 is injected into the cavity, whereby an integral assembly of the connector holder 7 and the rigid member 8 is obtained.

It will be understood that the present invention may be embodied with various other changes, modifications and improvements, which may occur to those skilled in the art, without departing from the spirit and scope of the invention defined in the following claims:

What is claimed is:

1. A tube connector device for connecting at least one first tube that is disposed on a first of opposite sides of a panel and at least one second tube that is disposed on a second of opposite sides of said panel, said tube connector device comprising:

at least one tubular connector for connecting said first tube and said second tube, such that said first tube is attached to a first open end of said tubular connector while said second tube is attached to a second open end of said tubular connector;

a connector holder means for holding said tubular connector such that an inner surface of said connector holder accommodates therein at least a part of an outer surface of said tubular connector; and fixing means for fixing said connector holder to said panel such that said connector holder is inserted into a communication hole that is formed through said panel, wherein said connector holder is made of a rubber or a thermoplastic elastomer having a predetermined degree of elasticity, and said connector holder includes a tubular body having an axial hole into which said tubular connector is fitted to provide fluid-tightness between said connector holder and said tubular connector, said connector holder further comprising a flange portion that extends outwardly from said tubular body in a radial direction of said connector holder that is fixable to said panel by said fixing means so that a fluid-tightness between said connector holder and said panel is assured.

2. A tube connector device according to claim 1, wherein said fixing means further comprises an attaching member including a tubular portion which is fitted on an external circumferential surface of said tubular body of said connector holder, and a plate portion which extends outwardly from an axial end of said tubular portion in a radial direction of said attaching member such that said plate portion covers at least said flange portion of said connector holder, and wherein said connector holder is additionally fixed to said panel by said attaching member such that said flange portion is interposed and gripped by and between said plate portion of said attaching member and said panel.

3. A tube connector device according to claim 2, wherein said attaching member and said connector holder are fixed to each other to provide an assembly.

4. A tube connector device according to claim 2, wherein said fixing means further comprises second instant attaching means for instantaneously attaching said connector holder to said panel by engagement with an engaging hole formed through said panel, said second instant attaching means being fixed to said attaching member.

5. A tube connector device according to claim 2, wherein said flange portion includes an annular protrusion portion formed on a portion thereof such that said protrusion portion is brought into abutting contact with said panel.

6. A tube connector device according to claim 2, wherein said axial hole includes at least one ring-like protrusion portion formed on an internal circumferential surface thereof.

7. A tube connector device according to claim 2, wherein said fixing means includes a nut which is fixed to said plate portion, and a bolt which passes through said flange portion so as to be screwed into said nut.

8. A tube connector device according to claim 2, wherein said connector holder has a guide portion formed on one of opposite side faces of said flange portion remote from said one of open ends to which said first tube is attached, said guide portion being fitted in said communication hole.

9. A tube connector device according to claim 8, wherein said fixing means further comprises first instant attaching means for instantaneously attaching said connector holder to said panel by engagement with a peripheral portion of said communication hole formed through said panel, said first instant attaching means being provided at an external periphery of said guide portion.

10. A tube connector device according to claim 9, wherein said first instant attaching means includes a plurality of tabs which are formed integrally with said guide portion on said external periphery such that said tabs are spaced apart from each other in a circumferential direction of said tubular body.

11. A tube connector device according to claim 9, wherein said first instant attaching means includes a radial extension which is formed integrally with said guide portion on said external periphery such that said radial extension completely surrounds said tubular body.

12. A tube connector device according to claim 11, wherein said guide portion has at least one blind hole formed on an axial end face thereof, so that said guide portion is radially inwardly deformable.

13. A tube connector device according to claim 1, wherein said fixing means further comprises a rigid member, and wherein said connector holder further includes a folded-back portion that is formed by folding back a peripheral portion of said flange portion inwardly in said radial direction of said connector holder, said rigid member being fitted in an annular groove that is defined by said flange portion and said folded-back portion, whereby said connector holder is fixed to said panel by said fixing means such that said folded-back portion is gripped by said rigid member and said panel.

14. A tube connector device according to claim 13, wherein said rigid member and said connector holder are fixed to each other to provide an assembly.

15. A tube connector device according to claim 13, wherein said fixing means further comprises a third instant attaching means for instantaneously attaching said connector holder to said panel by engagement with a peripheral portion of said communication hole formed through said panel, and wherein said rigid member includes an annular plate portion fitted in said annular groove and a tubular portion extending along an external circumferential surface of said tubular body from said plate portion in a direction remote from said first open end of said tubular connector to which said first tube is attached, and wherein said third instant attaching means is provided to said tubular portion of said rigid member.

16. A tube connector device according to claim 13, wherein said folded-back portion includes an annular protrusion portion formed on a portion thereof such that said protrusion portion is brought into abutting contact with said panel.

17. A tube connector device according to claim 13, wherein said axial hole includes at least one ring-like protrusion portion formed on an internal circumferential surface thereof.

18. A tube connector device according to claim 13, wherein said fixing means includes a tapped bush which is provided to said flange portion, and a bolt which passes through said rigid member so as to be screwed into said tapped bush.

19. A tube connector device according to claim 1, wherein said tubular connector has an engaging aperture provided at a part of said tubular connector that is accommodated in said connector holder, and said axial hole has an engaging tab formed on an internal circumferential surface thereof, said engaging aperture and said tab being engaged with each other so as to prevent axial movement of said tubular connector relative to said connector holder.

20. A tube connector device according to claim 1, wherein a part of said tubular connector includes two axially adjacent portions that are axially adjacent to each other, a first one of said two axially adjacent portions being closer to said second open end of said tubular connector than a second of said two axially adjacent portions, and having an external diameter larger than that of said second of said two axially adjacent portions;

said two axially adjacent portions defining an annular shoulder portion therebetween, and wherein said axial hole of said connector holder includes a large diameter portion and a small diameter portion that are axially adjacent to each other, said large diameter portion being fitted on said first of said two axially adjacent portions while said small diameter portion being fitted on said second of said two axially adjacent portions, so that an annular stepped portion is thereby defined between said large diameter portion and said small diameter portion of said tubular connector, so as to prevent axial movement of said tubular connector relative to said connector holder in a direction away from said second of said opposite sides of said panel toward said first of said opposite sides of said panel.

* * * * *